Oct. 3, 1944.    J. LYON    2,359,569
BEAK CAUTERIZER FOR FOWL AND THE LIKE
Filed Dec. 7, 1943    2 Sheets-Sheet 2
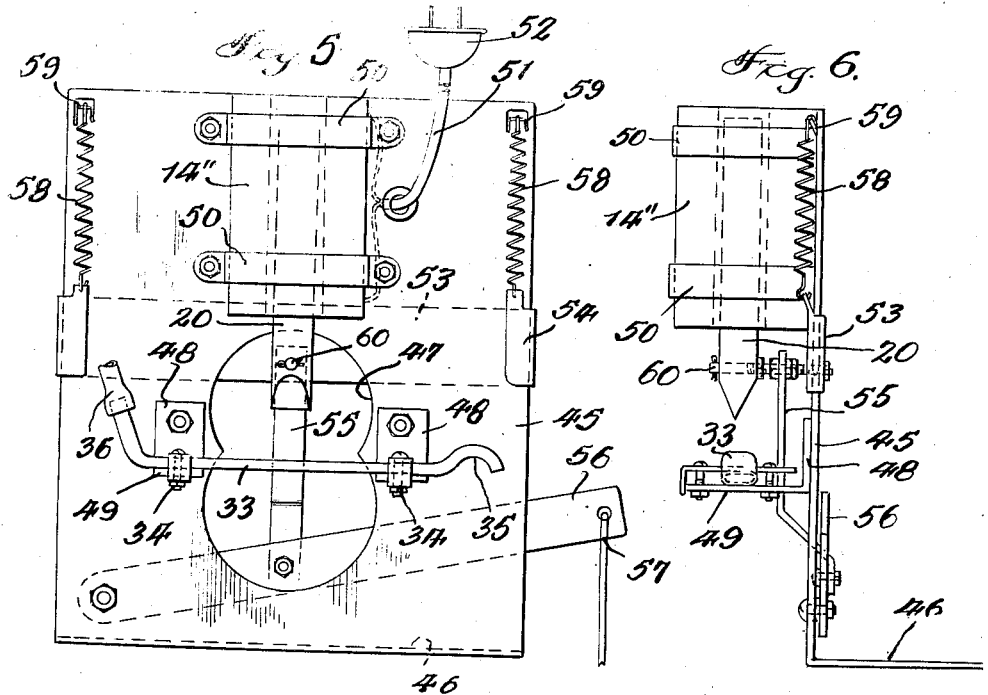
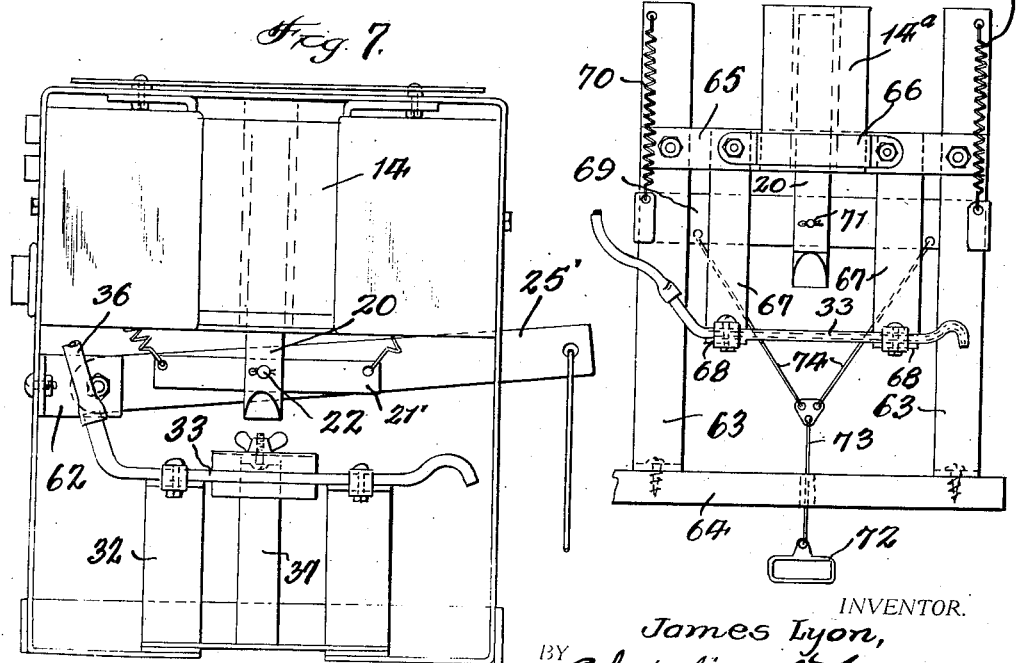
INVENTOR.
James Lyon,
BY Christian R. Nielsen
ATTORNEY Patented Oct. 3, 1944

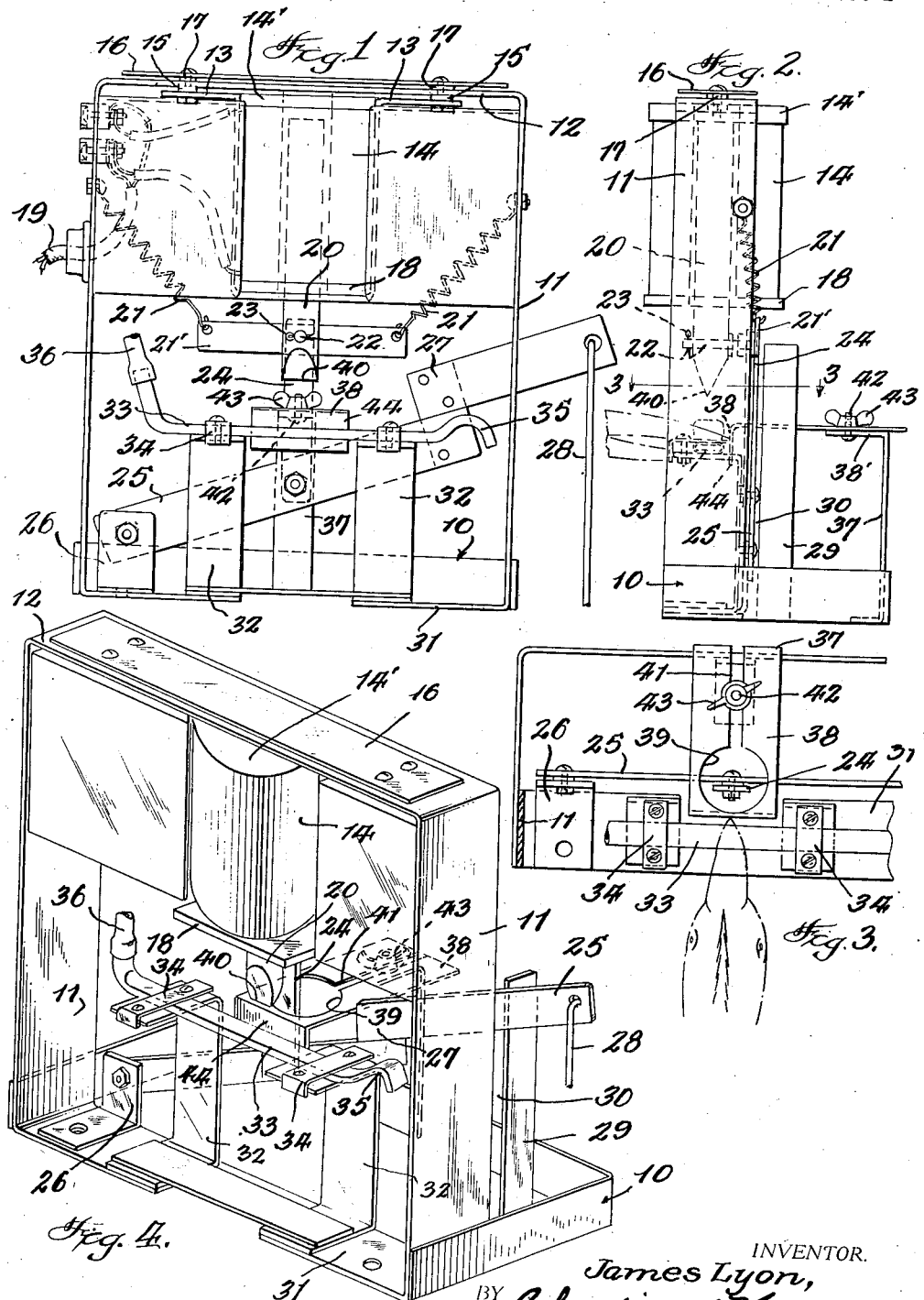

2,359,569

UNITED STATES PATENT OFFICE 2,359,569

BEAK CAUTERIZER FOR FOWL AND THE LIKE

James Lyon, San Diego, Calif.

Application December 7, 1943, Serial No. 513,278

13 Claims. (Cl. 128—303.10)

The invention relates to means for trimming the beaks of fowl or other poultry, and has for an object to present a simple appliance of this kind by which the beak may be trimmed with a minimum liability of excessive bleeding, and with a minimum of discomfort to the fowl.

As is well known, within a recent period it has been discovered to be advantageous to trim the upper beak of poultry, in order to prevent the animals from attacking each other persistently; to discourage cannibalism, and to minimize waste of feed, as well as to improve the quality of the fowl.

It has been found that snipping with a sharp instrument of the upper bill of poultry will discourage "picking," but after a time the bill renews its growth, and the bird will usually resume the objectionable and dangerous habit. It is therefore an important aim of my invention to present apparatus and method of effecting the trimming of beaks in such manner that the benefits will be more lasting, and the renewal of growth greatly delayed.

It is a special purpose of my invention to provide a device by which fowl may be quickly handled and their beaks trimmed with a minimum liability of injury to the tongue and lower beak, which it is not desirable to trim, and while it is not a common practice to trim the lower beak, this may be accomplished with the device when found necessary.

A further important aim of the invention is to present a novel anvil device and cooler, with means to maintain the anvil in a cool condition while a cauterizing device is operated thereover and engaging therewith on each operation.

A further important aim is to provide a novel water-cooling arrangement for the anvil.

It is a special object of the invention to give a construction which may be produced at a low cost, and which will be extremely serviceable and liable in a minimum degree to damage or deterioration incident to the uses of such equipment, so that it may be brought within reach of commercial poultry men by reason of low cost, and so that the benefits of trimming with delayed recovery, may be lastingly carried out with my invention, with benefit to the industry.

Additional objects, advantages and features of invention reside in the construction, arrangement and combination of parts involved in the embodiment of the invention, as will be more readily understood from the following description and accompanying drawings, wherein Figure 1 is a front elevation of a machine constructed in accordance with my invention.

Figure 2 is a side elevation with the position of a beak of a fowl dotted in trimming position thereon.

Figure 3 is a horizontal sectional view on the line 3—3 of Figure 2.

Figure 4 is a perspective view of the machine illustrated in the preceding figures.

Figure 5 is a front elevation of a modification of the construction of the machine.

Figure 6 is a side elevation thereof.

Figure 7 is a front elevation of a still further modification.

Figure 8 is a similar view of a third modification.

There is illustrated in Figures 1 to 4, a machine comprising a frame-work including a rectangular foot frame 10, and an upstanding back frame 11 of strap metal assembled in accordance with conventional practice. The frame 11 is substantially U-shaped in form, providing legs at opposite sides of the foot frame 10 and a cross plate 12 upon which there is suspended by L-shaped brackets 13 a heating coil 14, which is insulated from the cross piece 12 and also closed by a block of insulating material 14'. The brackets 13 are also spaced from the cross piece 12 by insulating washers 15, and a supplemental guard plate 16 is connected over the cross plate 12 and spaced therefrom by additional washers 17. The coil is also closed at its lower part and insulated by a block of material 18. Conventional electrical connections may be made with the coil, by means of a lead-in extension cord 19. The lower insulation 18 is apertured in alinement with a central core passage within the coil, and vertically reciprocable in the coil there is a beak-trimming plunger 20 which extends through the block 18 and below the coil a distance, being yieldingly supported by means of contractile springs 21 attached to each of the leg portions of the frame and to a cross bar 21' having a pivot stud 22 projected forwardly therefrom and engaged pivotally through the lower part of the plunger, the latter being retained thereon by means of the cotter pin 23 through the extremity of the pin 22. Extended downwardly from the pin 22 immediately adjacent the bar 21', there is a draw link 24, the lower end of which is pivoted upon an operating lever 25 of the second order, its fulcrum being a bracket 26 adjacent the leg of the frame at the left hand side, the swinging end of the lever being extended outwardly beyond the opposite side of the frame, with an upward offset as at 27, and having an operating link 28 connected to its extremity, which may be pedal operated or otherwise operated, as found expedient; or the end of the lever may be operated as a hand lever. Immediately to the rear of the right hand leg of the frame, an upstanding bar 29 is secured upon the foot frame, parallel to the leg, and affording a slot 30 in which the end of the lever 25 is movable as a guide.

Mounted upon foot extensions 31 of the legs of the upstanding frame, there are two U-shaped brackets 32, the lower arms of which are secured to the foot portion mentioned, while their upper arms extend forwardly in parallel relation, adjacent respective legs of the frame, and supported thereupon is a flattened hard copper tube constituting an anvil 33 of generally planiform shape throughout between the bracket and some distance beyond, being held upon the brackets releasably by means of clamp plates 34 screwed to the upper arms of the respective brackets. The discharge end of the tubular anvil is bent upwardly a short distance, and then curved downwardly, as at 35, while the opposite end of the tube is left unflattened at a distance beyond the adjacent bracket, and has fitted thereon one end of a rubber tube or other duct 36, by which cooling water may be supplied to the anvil, to flow longitudinally therethrough and to be discharged at the end at 35. Any usual means for supplying water may be utilized, it being sometimes customary to use a large bucket from which the water is syphoned by means of the tube 36, this expedient being one well known for supplying water by gravity and therefore not being illustrated in detail.

The lower end of the plunger 20 is bevelled to a transverse linear edge 40, and the anvil 33 is positioned so that this edge may be depressed into engagement with the anvil medially of the latter. The edge 40 is preferably not sharp, in order that when in operation it will not quickly cut the bill of a fowl, but by reason of the heating of the plunger by the coil 14, the bill will be trimmed by cauterizing action rather than sharp cutting.

Upon the rear portion of the frame 10, a bracket 37 is erected, having a forwardly extended horizontal arm 38', and laid thereupon and extended forwardly there is a beak stop plate 38, having a large opening 39 therein, in which the drawlink 24 operates, and from which a longitudinal slot 41 extends rearwardly, a bolt 42 being engaged upwardly through the arm 38 of the bracket and through the slot, with a wing nut 43 engaged thereupon and clamping the slotted portion of the plate 38 to the arm 38'. The forward end of the plate 38 is bent downwardly to form a vertical planiform stop flange 44, which may be adjusted in spaced relation to the anvil 33 or close thereto, according to the position of the trimming edge 40 of the plunger, so that when the upper bill of a fowl is laid upon the anvil and projected rearwardly into engagement with the flange 44, the edge 40 of the plunger will engage the bill at a proper distance from the tip of the bill when the plunger is pressed downwardly.

In the use of this invention as described, being set and secured upon a suitable table or the like, and the current supply 19 being connected to a suitable source of current for the coil 14, a fowl grasped by the operator and the mouth being open, the upper bill portion is presented from the front over the anvil 33, until the tip of the bill engages the flange 44, as dotted in Figures 2 and 3. The lever 25 is then operated to draw the plunger 20 downwardly, pressing the edge 40 upon the upper side of the beak firmly, but not with such pressure as to crush the bill, and the heat of the plunger will cause it to quickly penetrate through the bill, trimming off the outer extremity thereof. This leaves the lower bill intact, and the tongue of the fowl also will be held below the anvil 33. Water being supplied properly through the tube 36, the anvil will be maintained in a cool condition, so that there is no likelihood of burning or scorching of the lower bill or tongue of the fowl. Also, the upper bill is cooled to a considerable extent during the trimming operation.

In Figure 5 there is illustrated a modification of the invention, greatly simplified, in which the frame-work consists of a single plate 45 of rectangular form, having a lower end portion bent at right angles on a horizontal line to form a foot-plate 46, the body of the plate 45 then being a vertical planiform rectangular piece, as shown in elevation in Figure 5. A large opening 47 is formed in the lower half of this plate, at opposite sides of which opening brackets 48 are secured upon the plate, having outstanding horizontal arms 49 upon which an anvil 33 is mounted by clamp plates and screws 34 similar to those first described. A heating coil 14" is mounted upon the forward side of this plate 45 by means of strap brackets 50 secured to the plate, and a conventional service cord 51 may be connected to the coil and provided with a connecting plug 52 for engagement with conventional electric circuit outlets. A bar yoke 53 of sheet metal, having its extreme end portion bent around opposite edges of the plate 45 so as to slidably fit upon the plate, is connected by a link 55 to an operating lever 56 therebelow, pivoted at the left hand side of the plate, and projecting beyond the opposite side of the plate, so that it may be operated as a hand lever, or by means of the link 57 shown, which may be extended to any usual foot pedal, not illustrated. The bar 53 is supported at each end by means of respective contractile springs 58 connected to the extremities of the inturned portions 54 of the bar, at the lower end of the springs, the upper ends of the springs being hooked over tongues 59 struck out of the body of the upper edge portion of the plate 45, as shown. In the coil 14" there is reciprocable a plunger 20, the same as that first described, operated and supported by means of a pivot pin 60, set in the plate 53, the link 55 having this pin 60 set therein rigidly, as may be seen in Figure 6. With the bar 53 at the upper limit of its movement, the lower edge portion thereof extends across the opening 47, and the pin 60 is freely movable in the opening 47 for operation of the plunger in the same manner as before described.

The form shown in Figures 5 and 6 as well as other forms, is admirably suited for clipping a wing of young chicks. In this operation the last joint of one wing is severed, and as may be seen in Figure 6, ample room for admission of a chick's wing is provided between the anvil 33 and the link 55. It will be apparent that by the use of the device, the wing will be cauterized so that bleeding and mortality is eliminated, and a good, clean operation is assured.

In Figure 7, a further modification of the device is shown, which utilizes the same construction, the same mounting of the anvil and heating coils and the same manner of support of the plunger by spring devices as first described. The operating lever 26' however, is of channel construction for greater rigidity of the cauterizing plunger, projecting from the right hand side of the frame as before, but pivoted at its left end upon a bracket 62 mounted above the level of the anvil on the left-hand leg of the frame. This construction of the device is operated in the same manner as that first described, and as before indicated, has the same parts otherwise, identical with those first described.

In Figure 8, there is shown a construction somewhat similar to that in Figures 5 and 6, where instead of a single large plate or the frame-work, two upstanding standards 63 are mounted upon a table top or the like 64, a cross bar 65 being connected between the standards near the upper ends, upon which cross bar a heating coil 14—a is mounted by means of a strap bracket 66 connected to the cross bar 65. Depending strap brackets 67 are connected to the cross bar, and formed with support arms 62 at the lower part upon which the anvil 33 is mounted, in the same manner as in the preceding forms of the apparatus, this anvil being the same as that first described, and similarly supplied with water. A sliding yoke bar 69 is disposed at the rear side of the upright 63, the extremities of the bar 69 being bent forwardly and inwardly around the standards 63, so as to hold the bar 69 slidingly on the standards, springs 70 being connected between the respective ends of the cross bar and the upper ends of the standards to yieldingly hold the cross bar 69 at the upper limit of its movement. A pivot stud 71 is engaged through the plunger 20 which is vertically slidable in the coil 14—a, in the same manner as in the other coils described, this plunger being operated in conjunction with the anvil 33 in the same manner as first described. For operation of the plunger, a foot treadle means 72 may be located below the table 64, connected by a cable 73 and branches 74 therefrom to respective ends of the cross bar 69, so that the latter may be drawn downwardly by pressure of the foot of the treadle 72, operating the plunger, as before described.

In the operation of the several modifications, the handling of the fowl and operation of the cauterizing trimmer is substantially the same as described in connection with the first described form of the device, as will be readily understood.

It should be appreciated that the particular formation of the right hand end of the anvil has particular advantage in use with low pressure water supply, in that water is retained in the major part of the tube, and cannot drain therefrom to such extent as to admit air.

In Figures 5 and 6, it will be noted that the upper part of the link 55 is offset forwardly and extends vertically in planiform shape at such distance behind the anvil that it will serve as a stop for the bill of a fowl when the bill is projected rearwardly across the anvil. The lower part of the link extends rearwardly through the opening 47 and downwardly to the lever 56, which is pivoted on the rear side of the frame plate 45.

In the present instance the link 55 is adjustable toward and away from the anvil by being slidable along the stud 60, the latter being threaded, and the link held thereon at adjusted positions by nuts engaged on the stud at opposite sides of the link.

As shown, the inlet end of the tubular anvil is bent upwardly so that water will be retained in the anvil in case the rubber tubing 36 is removed, but the upturning of this end of the anvil is not essential if the supply tube 36 leads downward thereto. The discharge end of the anvil tube is curved upwardly to a height at least equal to the thickness of the tube before being bent downwardly, in order to insure exclusion of air in case a very slow flow of water should occur from the supply.

While I have described my invention with great particularity, in the specific embodiments which are the best constructions known to me, it will, nevertheless, be understood that these are exemplary, and that various other modifications in the construction, arrangement and combination of parts, substitution of materials and substitution of equivalents, mechanical and otherwise, may be made without departing from the spirit of the invention, except as more specifically delineated in the appended claims, wherein I claim:

1. A device for trimming the beaks of poultry and the like, consisting of an anvil element, a vertically reciprocable blunt-edged severing member thereover, means to operate the severing member means to heat the severing member to a cauterizing temperature, the severing member having a contractile spring support engaged therewith, said anvil being a tubular member and means to supply cooling liquid to the anvil.

2. The structure of claim 1 in which said anvil has an inlet and a discharge end, the discharge end being curved upwardly at least the thickness of the anvil and then curved downward, for the purposes indicated.

3. A device of the character described comprising a frame, an electrical heating coil mounted on the upper part thereof, a core-like severing member reciprocable therein having an outer transverse severing edge, an anvil in the path of the severing member, means to cool the anvil and means to operate the severing member.

4. The structure of claim 3 in which said anvil is a tubular member, and means to supply coolant liquid thereto.

5. An anvil for the purposes described consisting of a tubular body portion having an end portion turned upward and then downward, for the purposes described.

6. A device of the character described comprising a framing, an anvil thereon, a severing member mounted for vertical movement thereon over the anvil, means to operate the severing member consisting of a link connected to the severing member and having a vertical portion rearwardly of the anvil as a stop for poultry bills, and an operating member connected to the lower part of the link.

7. The structure of claim 6 in which an electric heating coil is provided around the upper part of the severing member to heat the same to a cauterizing temperature.

8. A device of the character described comprising a framing, an anvil thereon, a severing member vertically slidable on the framing over the anvil and having a blunt severing edge coactive with the anvil, spring means to hold the severing member yieldingly at the upper limit of its movement, means to operate the severing member and means to heat the severing member to a cauterizing temperature.

9. The structure of claim 8, in which said anvil is a tubular member, and means to supply a coolant liquid thereto.

10. The structure of claim 8, in which said severing member is a bar of substantial cross sectional measurement for the purposes described, and said means to heat the bar is an electrical heating coil mounted on the upper part of said frame, said bar being slidable therewithin, and having a severing edge at its lower part.

11. The device of the character described consisting of a frame, a horizontal anvil mounted thereon, said anvil being of small vertical dimension whereby to enter the mouth of a fowl, and being of moderate dimension horizontally in one direction whereby to permit the upper bill of the fowl to project thereacross and beyond, a vertically reciprocable bill severing member thereover, means to operate the severing member, said anvil being a tubular member, means to supply coolant liquid thereto, and means to heat the severing member to a cauterizing temperature.

12. A beak trimming device of the character described comprising a metal plate having a lower portion bent at right angles to form a foot piece, the major part of the plate upstanding therefrom, a lever pivoted at one side of the upstanding portion of the plate, means to operate the lever, an anvil on the lower part of the plate, a severing member mounted on the lever for cooperation on the anvil, said severing member being a bar member having a downwardly presented blunt severing edge, and an electrical coil for heating the bar.

13. A beak trimming device of the character described comprising a metal plate having a lower portion bent at right angles to form a foot piece, the major part of the plate upstanding therefrom, a lever pivoted at one side of the upstanding portion of the plate, an anvil on the lower part of the plate, said plate being formed with an opening of substantial size therethrough, said anvil being mounted horizontally across the opening, a guide bar against the back of the upstanding plate, and having lateral portions embracing opposite edges of the plate slidably, spring support means for the guide bar, a severing member mounted on said guide bar for cooperation on the anvil, a link connected to the guide bar and said lever, and said plate having a vertical part adjacent the anvil as a stop.

JAMES LYON.